United States Patent
Li et al.

(10) Patent No.: US 11,054,603 B2
(45) Date of Patent: Jul. 6, 2021

(54) METHOD FOR MANUFACTURING HYBRID CABLE

(71) Applicant: ZHONGTIAN POWER OPTICAL CABLE CO., LTD., Nantong (CN)

(72) Inventors: Ming Li, Nantong (CN); Cang-Ping He, Nantong (CN); Jie Lu, Nantong (CN); Xu-Guang Miao, Nantong (CN); Hai-Jun Xue, Nantong (CN)

(73) Assignee: ZHONGTIAN POWER OPTICAL CABLE CO., LTD., Nantong (CN)

( * ) Notice: Subject to any disclaimer, the term of this patent is extended or adjusted under 35 U.S.C. 154(b) by 0 days.

(21) Appl. No.: 16/889,283

(22) Filed: Jun. 1, 2020

(65) Prior Publication Data
US 2020/0341226 A1 Oct. 29, 2020

Related U.S. Application Data

(60) Division of application No. 16/395,514, filed on Apr. 26, 2019, now Pat. No. 10,712,520, which is a
(Continued)

(30) Foreign Application Priority Data
Jul. 12, 2017 (CN) .......................... 201710565293.1

(51) Int. Cl.
*H01B 13/08* (2006.01)
*H01B 13/14* (2006.01)
(Continued)

(52) U.S. Cl.
CPC .......... *G02B 6/4488* (2013.01); *E21B 17/003* (2013.01); *G02B 6/4492* (2013.01);
(Continued)

(58) Field of Classification Search
CPC ... G02B 6/4488; G02B 6/4492; E21B 17/003; E21B 47/00; H01B 7/0018;
(Continued)

(56) References Cited

U.S. PATENT DOCUMENTS 4,324,453 A * 4/1982 Patel .................... G02B 6/4401
174/23 C
4,367,917 A * 1/1983 Gray .................... G02B 6/2558
385/102
(Continued)

FOREIGN PATENT DOCUMENTS

| CN | 102074301 A | 5/2011 |
|---|---|---|
| CN | 102930934 A | 2/2013 |
| CN | 203276901 U | 11/2013 |

*Primary Examiner* — Timothy J Thompson
*Assistant Examiner* — Michael F McAllister
(74) *Attorney, Agent, or Firm* — ScienBiziP, P.C.

(57) ABSTRACT

A method of manufacturing hybrid cable applicable in oil wells provides an FIMT, a conductor layer formed by continuous laser welding and cylindrically covered the outer surface of the FIMT, the outer cylindrical surface of the conductor layer being covered with a high temperature resistant insulating layer by a continuous extrusion method or by wrapped helically with insulating tapes around the outer surface of the conductor layer and the external steel tube cylindrically covered the outer surface of the insulating layer. The conductor layer is coaxial with the FIMT, the inner space of the hybrid cable to accommodating excess length of the optical fiber to allow for thermal expansions and tensile stress on the optical cable. The thickness of the insulating layer cylindrically covering the outer surface of the conductor layer is able to be increased, improving the insulating property.

2 Claims, 6 Drawing Sheets

Related U.S. Application Data continuation-in-part of application No. PCT/CN2017/101232, filed on Sep. 11, 2017.

(51) Int. Cl.

| | | |
|---|---|---|
| *H01B 13/22* | (2006.01) | |
| *E21B 47/00* | (2012.01) | |
| *G02B 6/44* | (2006.01) | |
| *E21B 17/00* | (2006.01) | |
| *H01B 7/00* | (2006.01) | |
| *H01B 7/20* | (2006.01) | |
| *H01B 7/02* | (2006.01) | |
| *H01B 7/28* | (2006.01) | |
| *H01B 13/00* | (2006.01) | |
| *H01B 7/29* | (2006.01) | |
| *H01B 7/04* | (2006.01) | |
| *H01B 9/00* | (2006.01) | |

(52) U.S. Cl.
CPC ......... *H01B 7/0018* (2013.01); *H01B 7/0241* (2013.01); *H01B 7/0275* (2013.01); *H01B 7/046* (2013.01); *H01B 7/207* (2013.01); *H01B 7/2806* (2013.01); *H01B 7/292* (2013.01); *H01B 13/0016* (2013.01); *H01B 13/08* (2013.01); *H01B 13/14* (2013.01); *H01B 13/22* (2013.01); *E21B 47/00* (2013.01); *H01B 9/005* (2013.01)

(58) Field of Classification Search
CPC .... H01B 7/0241; H01B 7/0275; H01B 7/046; H01B 7/207; H01B 7/2806; H01B 7/292; H01B 13/0016; H01B 13/08; H01B 13/14; H01B 13/22; H01B 9/005
USPC ........................................................ 174/70 R
See application file for complete search history.

(56) References Cited

U.S. PATENT DOCUMENTS

| | | | | |
|---|---|---|---|---|
| 4,432,605 | A * | 2/1984 | Niiro | G02B 6/4427 385/111 |
| 4,477,147 | A * | 10/1984 | Winter | B23K 1/16 228/151 |
| 4,479,702 | A * | 10/1984 | Pryor | G02B 6/4488 264/1.28 |
| 4,508,423 | A * | 4/1985 | Winter | G02B 6/4488 228/148 |
| 4,573,253 | A * | 3/1986 | Smith | G02B 6/4488 29/460 |
| 4,859,989 | A * | 8/1989 | McPherson | H01B 7/328 340/510 |
| 4,878,733 | A * | 11/1989 | Winter | G02B 6/4488 385/102 |
| 6,404,961 | B1 * | 6/2002 | Bonja | E21B 17/00 385/109 |
| 7,082,239 | B2 * | 7/2006 | Kuczma | B82Y 30/00 385/100 |
| 9,377,598 | B2 * | 6/2016 | Dowd | G02B 6/4492 |
| 9,691,523 | B2 * | 6/2017 | Pourladian | H01B 7/226 |
| 9,915,798 | B2 * | 3/2018 | Lowell | G02B 6/4416 |
| 2003/0169179 | A1 * | 9/2003 | James, II | G02B 6/4433 340/854.9 |
| 2008/0247718 | A1 * | 10/2008 | Dowd | E21B 17/206 385/113 |
| 2012/0076464 | A1 * | 3/2012 | Dowd | G02B 6/4492 385/109 |
| 2012/0160361 | A1 * | 6/2012 | Fischer | B23K 31/027 138/145 |
| 2017/0184804 | A1 * | 6/2017 | Lowell | G02B 6/443 |
| 2019/0278038 | A1 * | 9/2019 | Kamath | G02B 6/4488 |

* cited by examiner

METHOD FOR MANUFACTURING HYBRID CABLE

FIELD

The present disclosure relates generally to oil extraction, and more particularly, to a method for manufacturing hybrid cable used in oil and gas wells.

BACKGROUND

Hybrid cables are used for transmitting data in the oil and gas well survey. The excellent performance of optical fiber, such as immunity to electromagnetic interference, small diameter, light weight, compliance, high temperature resistance, and corrosion resistance, etc., enable optical fiber sensing system and detectors to work in the harsh environment in the oil well and measure environmental parameters accurately. Moreover, a detector of optical fiber sensing system with a small cross-sectional area is convenient to use in the well. When in use, the hybrid cable is placed in the well to collect sample data, and the detector receives optical signals and electricity through the hybrid cable. After the survey is completed, the cable is pulled out of the well. The hybrid cable can also be used for other downhole operations.

Design factors of hybrid cables for corrosive environment of high pressure and high chemical corrosion (over 200° C. 100 MPa) include, but are not limited to, selection of special optical fibers of corresponding temperature grades, and structural design of cables for protecting optical fibers. Existing hybrid cables generally have a number of fibers in the metal tube (FIMT) twisted with a number of circular insulated wires concentrically placed in the outer steel tube of the hybrid cable. The wall thickness of the outer steel tube is designed according to the downhole pressure. Due to limitations on the outer diameter of the hybrid cable, the inner diameter of the steel tube in FIMT is also a fixed value when the outer diameter is constant. Since the thermal expansion coefficient of the metal is much higher than the thermal expansion coefficient of the optical fiber, steel tube in FIMT becomes elongated when heated. If the optical fiber does not have sufficient excess length, the optical fiber will be stretched by the steel tube, which may result in fiber attenuation or even breakage, hence, affecting the efficiency and life expectancy of the fiber.

To provide excess length of the fiber, there must be space for the fiber to be curved. One solution is to increase the outer diameter of the FIMT. However, in the inner circular space defined by the inner diameter, increasing the outer diameter of the FIMT may cause the outer diameter of the insulating layer of the conductor to decrease. Thinning of the insulation layer causes a decrease in the insulation capacity of the conductor. The hybrid cable may not be able to supply power due to damage to the insulation of the wires in challenging environment.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features of the present application more obvious, a description of specific embodiments of the present disclosure will be described with reference to the accompanying drawings. The present disclosure can be implemented in many ways different from those described herein, and those skilled in the art can make similar improvements without violating the contents of the present disclosure. Therefore, the present disclosure is not to be considered as limiting the scope of the embodiments to those described herein.

Several definitions that apply throughout this disclosure will now be presented.

Unless otherwise defined, all technical and scientific terms used herein have the same meaning as commonly understood by one skilled in the art. The terms used in a specification of the present application herein are only for describing specific embodiments, and are not intended to limit the present application.

Figure 1:
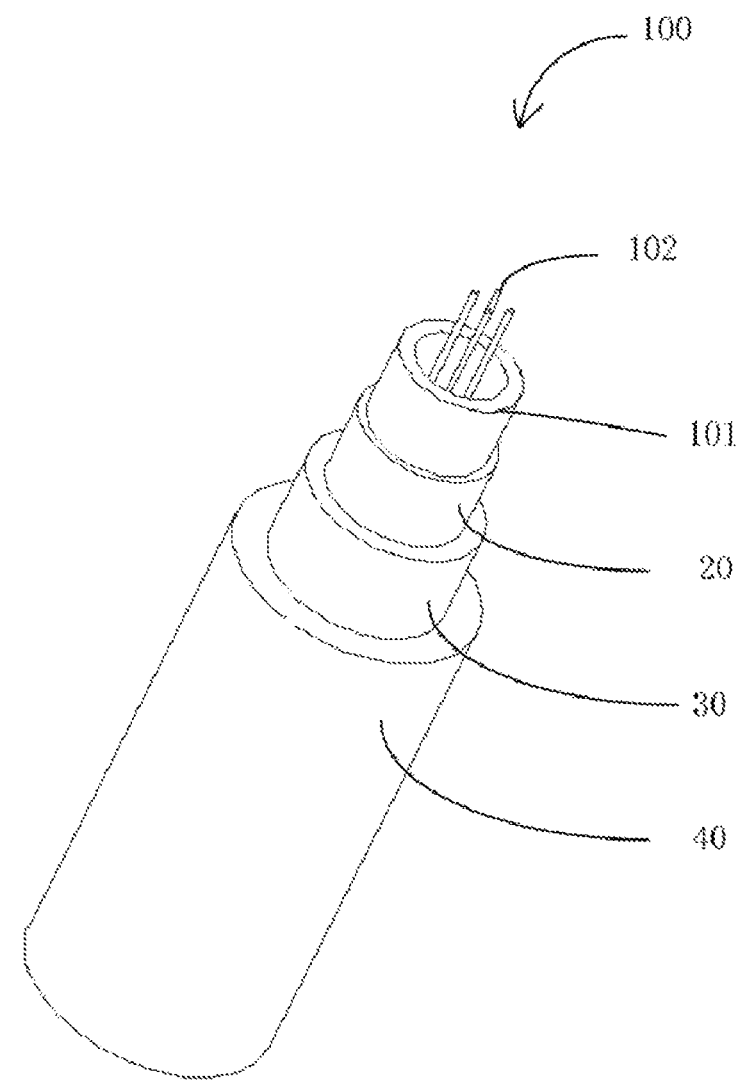
FIG. 1 is a structural diagram of a first embodiment of the hybrid cable of the present disclosure.
Figure 2:
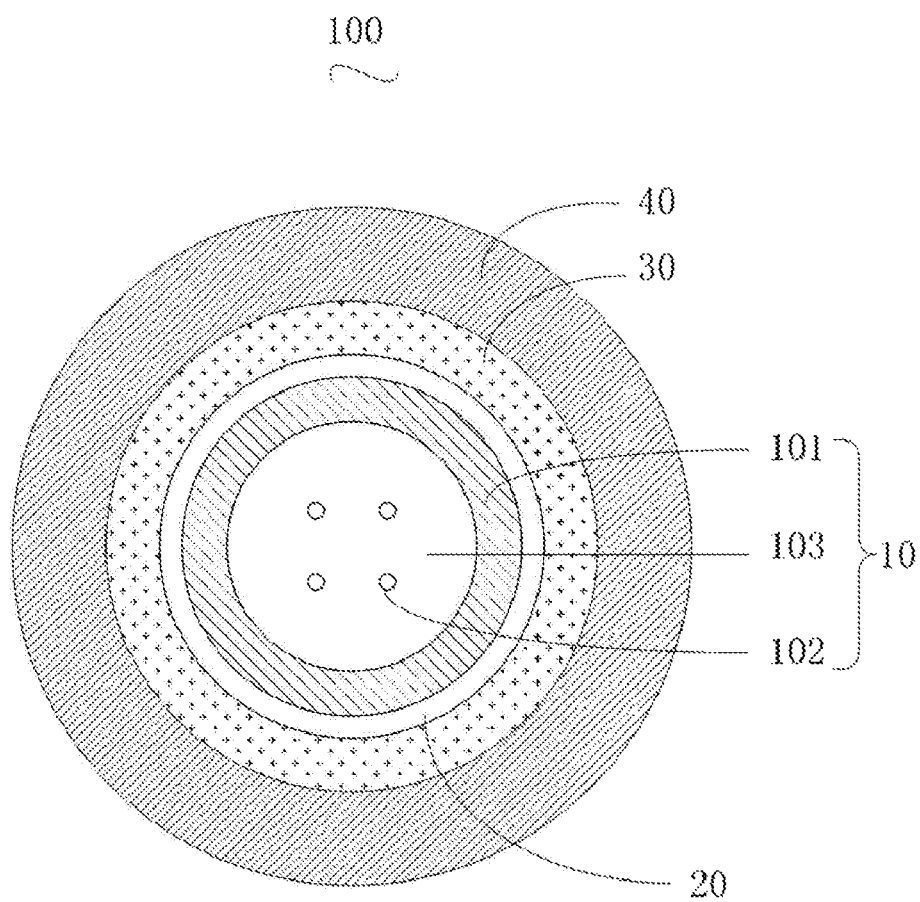
FIG. 2 is a cross-sectional diagram of the first embodiment of the hybrid cable of the present disclosure.

FIG. 1 and FIG. 2 illustrate a structural diagram and a cross-sectional diagram of a hybrid cable in a first embodiment, respectively. The hybrid cable 100 of the present disclosure is applicable in exploring oil wells, as a transmission medium with long service life to withstand harsh environment such as high temperature, high pressure, and heavy acidic corrosion in the oil wells.

The hybrid cable 100 comprises a FIMT 10, a conductor layer 20 which is cylindrically covered around the outer surface of the FIMT 10, an insulating layer 30 formed by continuous extrusion, cylindrically covering the outer surface of the conductor layer 20, and an outer steel tube 40 cylindrically covering the outer surface of the insulating layer 30. The FIMT 10 includes a steel tube 101, a number of optical fibers 102 placed in the steel tube 101 and gel 103 filling the inner space of the steel tube 101. The optical fibers 102 are embedded within the gel 103. The steel tube 101 is produced by laser welding using 316L stainless steel strip. The gel 103 is a hydrogen scavenger gel which has hydrogen absorbing function by addition of hydrogen absorbing agent to the gel, preventing hydrogen from harming the fiber. The conductor layer 20 is a smooth copper tube which is formed by continuous laser welding of copper strip and cylindrically covers the outer surface of the a steel, tube 101. The wall thickness of the copper tube is less than or equal to 0.15 mm. The copper tube has good electrical conductivity and is used as the electric transmission medium of the hybrid cable 100.

A large amount of hydrogen and free hydrogen are present in the oil wells. Hydrogen can penetrate the metal protective layer and enter into the fiber core and chemically react with lattice defects or doping elements in the fiber core to form OH bonds. Hydrogen can also accumulate in the form of hydrogen molecules inside the fiber core. The above phenomena may cause increase in attenuation and affect the transmission performance of the fiber.

Carbon-coated fibers have excellent hydrogen resistance and avoid attenuation and strength degradation caused by hydrogen and water. However, at elevated temperatures (>170° C.), the carbon coating becomes permeable to hydrogen, losing its hermeticity. Carbon-coated fibers are primarily used for downhole environments where the temperature is <170° C. In addition, the carbon-coated fibers are expensive which increases the cost of hybrid cable 100. Copper also has excellent hydrogen resistance. Therefore, the copper tube also acts as, a barrier to hydrogen diffusion, which reduces hydrogen diffusion rate in the hybrid cable 100 and hydrogen-induced loss increase in the optical fibers 102, thereby improving the life expectancy of the hybrid cable 100. Compared to carbon-coated fiber, copper has a higher operating temperature of 300° C. and a lower cost as a barrier to hydrogen diffusion in the hybrid cable 100.

In the present embodiment, the copper tube is used as conductor layer 20 and a barrier to hydrogen diffusion. In other embodiments, a copper alloy tube, an aluminum tube, or an aluminum alloy tube can also be used as conductor layer 20.

The insulating layer 30 is made of polymer material. In the present embodiment, polytetrafluoroethylene which has high temperature resistance is used as insulating layer 30. In other embodiments, an insulating layer 30 may be formed by using other high temperature resistant insulating materials depending, on the ambient temperature. The insulating layer 30 is extruded continuously and cylindrically covers the outer surface of the conductor layer 20 in the present embodiment. In other embodiments, the insulating layer 30 can be helically wrapped with insulating tape around the outer surface of the conductor layer 20.

In the present embodiment, the external steel tube 40 is formed by continuous laser welding using a thick layer of NAS825 alloy steel strip cylindrically covering the outer surface of the insulating layer 30. NAS825 alloy is a highly corrosion-resistant alloy with high nickel content, which has excellent corrosion resistance for oxidizing and non-oxidizing acids in the harsh environment of the oil wells. In other embodiments. other materials such as 316L and A626 can also be used to produce the external steel tube 40.

Figure 3:
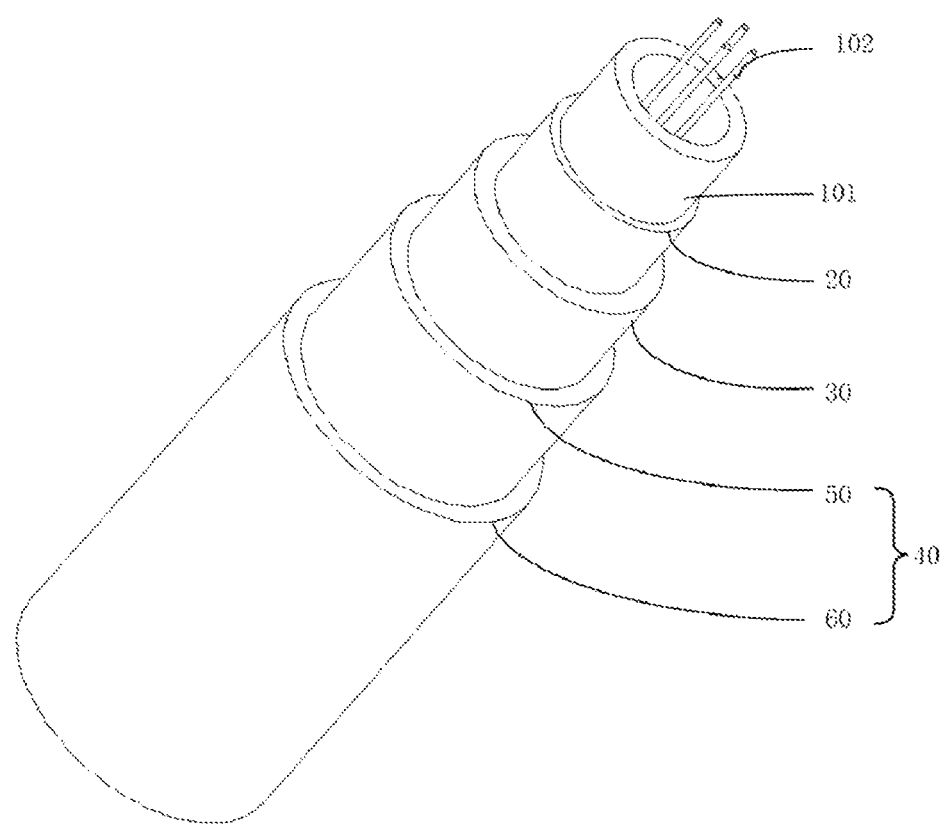
FIG. 3 is a structural diagram of a second embodiment of the hybrid cable of the present disclosure.
Figure 4:
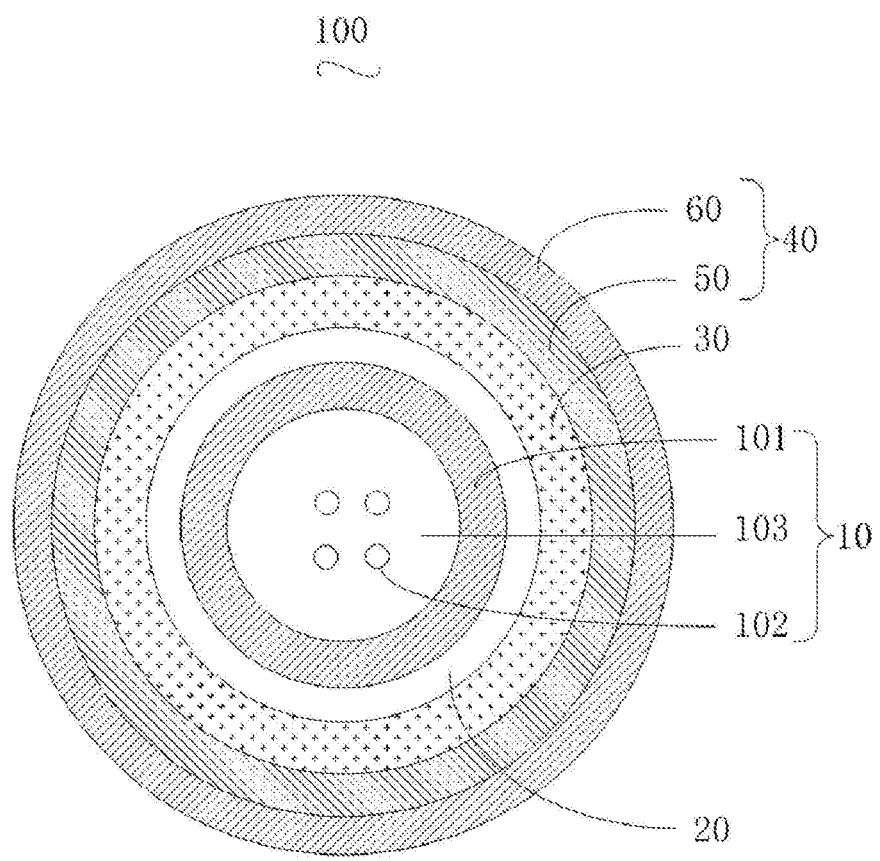
FIG. 4 is a cross-sectional diagram of the second embodiment of the hybrid cable of the present disclosure.

FIG. 3 and FIG. 4 show respectively a structural view and a cross-sectional view of the second embodiment of a hybrid cable 100. The hybrid cable 100 comprises an FIMT 10, a conductor layer 20 which is cylindrically covered around the outer surface of the FIMT 10, an insulating layer 30 formed by continuously extrusion and cylindrically covered around the outer surface of the conductor layer 20, and external steel tube 40 cylindrically covered around the outer surface of the insulating layer 30. The difference from the first embodiment and the second embodiment is that the external steel tube 40 in the second embodiment is composed of two layers of steel tube, that is, an inner steel tube 50 cylindrically covered around the outer surface of the insulating layer 30, and the outer steel tube 60 cylindrically covered around the outer surface of the inner steel tube 50.

Referring to FIG. 3 and FIG. 4, the inner steel tube 50 is formed by continuous laser welding using a 316L stainless steel strip and cylindrically covered around the outer surface of the insulating layer 30. The 316L stainless steel is a molybdenum-containing stainless, steel. which has good heat resistance and corrosion resistance. The outer steel tube 60 is formed by continuous laser welding using a thin layer NAS825 alloy steel strip and cylindrically covered around the outer surface of the inner steel tube 50. NAS825 alloy is a high-corrosion resistant alloy with high nickel content, which has excellent corrosion resistance for oxidizing and non-oxidizing acids in the harsh environment of the oil wells.

A thin-walled copper tube cylindrically covered around the outer surface of the steel tube 101 is a conductor layer 20 and a barrier to hydrogen diffusion and is formed by continuous laser welding. Then, a layer of polymer insulation layer 30 is extruded continuously or helically wrapped outside the copper tube so that the copper tube can be used as insulated conductors. The thin-walled copper tube is formed by continuous laser welding, so that leakage welding phenomenon caused by other welding methods such as argon arc welding may be avoided. The continuous length of the thin-walled copper tube can be several tens or hundreds of kilometers.

The wall thickness of the copper tube is less than or equal to 0.15 mm. Factors in determining the wall thickness is mainly to meet requirement of the DC resistance and the insulation capacity. Due to the limited outer diameter, the copper tube according to the present disclosure is thinner than in other hybrid cable 100, hence, the space inside the tube can be utilized effectively. Therefore, the thickness of polymer insulation layer is increased, which greatly reduces the manufacturing risk and increases the reliability of the hybrid cable. At the same time, due to the increase of insulation layer thickness, the product can work at a higher DC voltage level, expanding the scope of application of the hybrid cable. As a result, the electrical performance, optical performance and the ability to withstand hydrogen-induced loss increase of the hybrid cable 100 may be improved.

Figure 5:
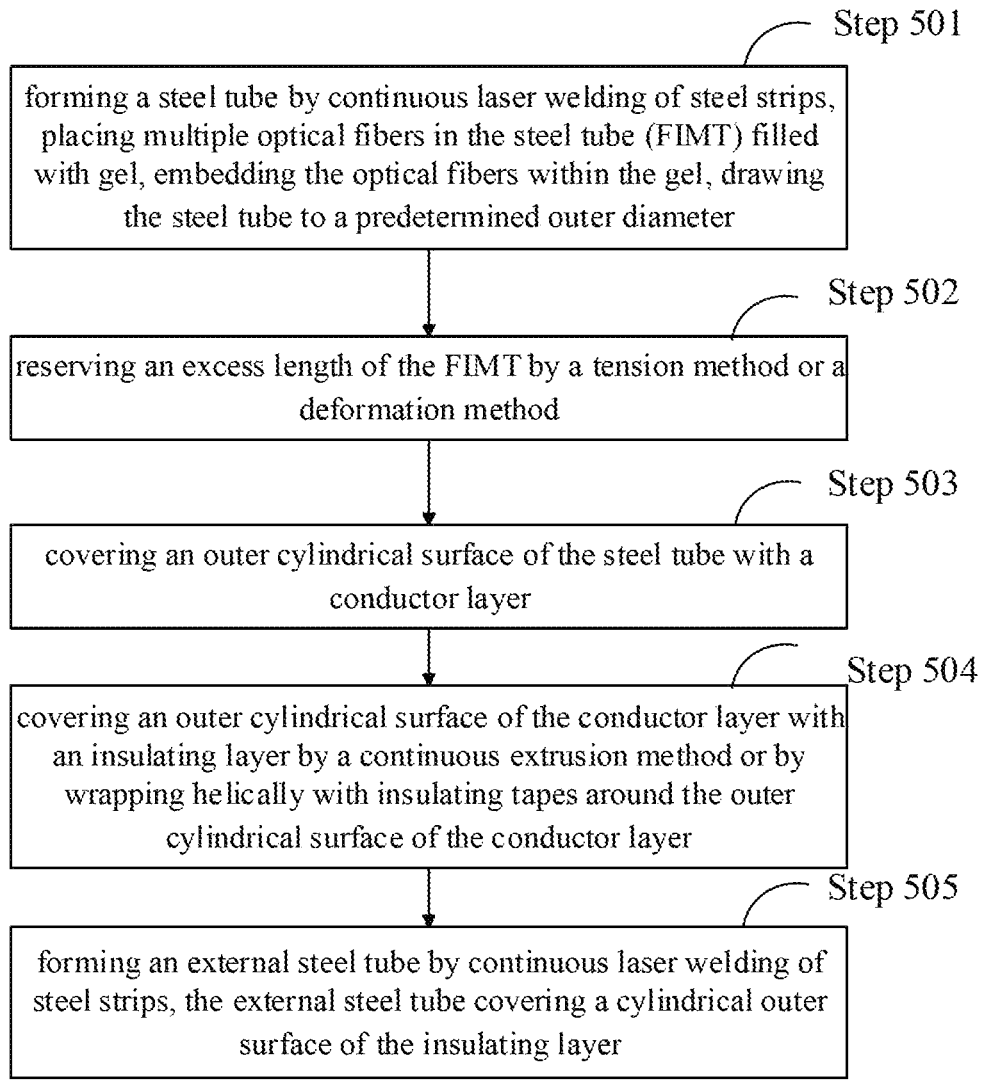
FIG. 5 is a flow chart showing a method of manufacturing the hybrid cable in one embodiment of the present disclosure.

FIG. 5 is a flow chart showing a manufacturing method of the first embodiment of the hybrid cable of the present disclosure. The method for manufacturing hybrid cable 100 comprises the following steps:

Step 501, forming a steel tube 101 by continuous laser welding of steel snips, placing multiple optical fibers 102 in the steel tube (FIMT) 101 filled with gel 103, embedding the optical fibers 102 within the gel 103, drawing the steel tube 101 to a predetermined outer diameter.

Step 502, reserving an excess length of the FIMT 10 by a tension method or a deformation method.

The tension method is used to form the excess length of the FIMT 10 by first, applying a tension to the steel tube 101 within the elastic range, then the tension is released, and the steel tube 101 is retracted, thereby the excess length of the FIMT 10 is reserved within the steel tube 101. In other embodiments, the deformation method can be used to generate the excess length. The steel tube is retracted by plastic deformation, generating excess length.

Step 503, covering an outer cylindrical surface of the steel tube 101 with a conductor layer 20.

The conductor layer 20 is a smooth and dense copper tube formed by continuous laser welding of copper strips and cylindrically covered around the outer surface of the steel tube 101. In other embodiments, the conductor layer 20 can be a copper alloy tube or an aluminum tube or an aluminum alloy tube.

Step 504, covering an outer cylindrical surface of the conductor layer 20 with an insulating layer 30 by a continuous extrusion method or by wrapping helically with insulating tapes around the outer cylindrical surface of the conductor layer 20.

A layer of polytetrafluoroethylene plastic is extruded continuously and cylindrically covered on the outer surface of the conductor layer 20 as an insulating layer 30, so that the copper tube is an insulated conductor. In other embodiments, other insulating polymer with high temperature resistance can be used as the insulating layer 30 according to the environment in which used. In addition, the insulating layer 30 can be wrapped helically around the outer surface of the conductor layer 20.

Step 505, forming an external steel tube 40 by continuous laser welding of steel strips, the external steel tube 40 covering a cylindrical outer surface of the insulating layer 30.

The external steel tube 40 is formed by continuous laser welding using a layer of NAS825 alloy steel strip and cylindrically covered around the outer surface of the insulating layer 30.

Figure 6:
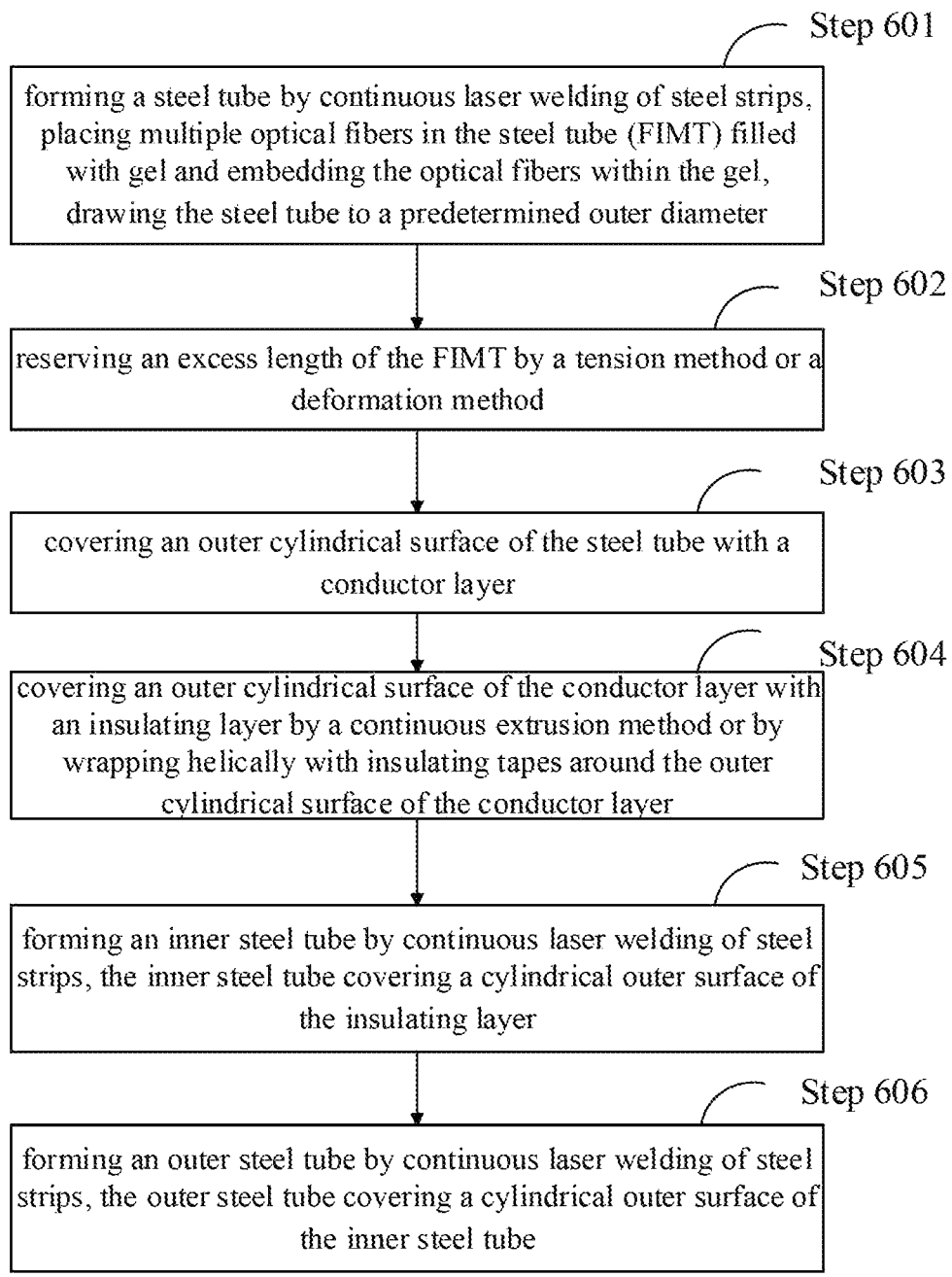
FIG. 6 is a flow chart showing a manufacturing method of a second embodiment.

FIG. 6 is a flow chart showing a manufacturing method of the second embodiment of the hybrid cable 100 of the present disclosure. The second embodiment of the manufacturing method of an hybrid cable 100 differs from the first embodiment in that the manufacture of the external steel tube 40 comprises the following two steps:

Step 605, forming an inner steel tube 50 by continuous laser welding of steel strips, the inner steel tube 50 covering a cylindrical outer surface of the insulating layer 30.

The inner steel tube 50 is formed by continuous laser welding of 316L steel strips and cylindrically covered around the outer surface of the insulating layer 30.

Step 606, forming an outer steel tube 60 by continuous laser welding of steel strips, the outer steel tube covering a cylindrical outer surface of the inner steel tube 50.

The outer steel tube 60 is formed by continuous laser welding of a thin layer of NAS825 alloy steel strip and cylindrically covered around the outer surface of the inner steel tube 50.

The manufacturing method of the hybrid cable 100 has simple process flow. The conductor layer 20 is coaxial with the FIMT 10, which effectively utilizes the inner space of the hybrid cable 100, so that there is sufficient space to reserve excess length of the optical fiber 102 to accommodate the thermal expansion elongation or the tensile stress of the optical cable 102. Furthermore, the thickness of the insulating layer 30 cylindrically covered around the outer surface of the conductor layer 20 can be increased, thereby improving the insulating property. In addition, the hydrogen scavenger gel is used to protect the optical fiber 102 from hydrogen loss. The copper tube is the conductor layer 20 which has good hydrogen barrier performance. The reliability and service life of the hybrid cable is improved.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A method for manufacturing a hybrid cable, comprising:
    forming a steel tube by continuous laser welding of steel strips, placing multiple optical fibers in the steel tube (FIMT) filled with gel, embedding the optical fibers within the gel, drawing the steel tube to a predetermined outer diameter, wherein the optical fiber is carbon coated fiber;
    reserving an excess length of the FIMT by a tension method or a deformation method;
    covering an outer cylindrical surface of the steel tube with a conductor layer formed by continuous laser welding of copper strips, a wall thickness of the conductor layer is less than or equal to 0.15 mm;
    covering an outer cylindrical surface of the conductor layer with an insulating layer by a continuous extrusion method or wrapping helically with insulating tapes around the outer cylindrical surface of the conductor layer; and
    forming an external steel tube by continuous laser welding of steel strips, the external steel tube covering an outer cylindrical surface of the insulating layer.

2. A method for manufacturing a hybrid cable, comprising:
    forming a steel tube by continuous laser welding of steel strips, placing multiple optical fibers in the steel tube (FIMT) filled with gel and embedding the optical fibers within the gel, drawing the steel tube to a predetermined outer diameter, wherein the optical fiber is carbon coated fiber;
    reserving an excess length of the FIMT by a tension method or a deformation method;
    covering an outer cylindrical surface of the steel tube with a conductor layer formed by continuous laser welding of copper strips, a wall thickness of the conductor layer is less than or equal to 0.15 mm;
    covering an outer cylindrical surface of the conductor layer with an insulating layer by a continuous extrusion method or wrapping helically with insulating tapes around the outer cylindrical surface of the conductor layer;
    forming an inner steel tube by continuous laser welding of steel strips, the inner steel tube covering an outer cylindrical surface of the insulating layer; and
    forming an outer steel tube by continuous laser welding of steel strips, the outer steel tube covering an outer cylindrical surface of the inner steel tube.

* * * * *